United States Patent [19]

Edwards et al.

[11] Patent Number: 4,524,128

[45] Date of Patent: Jun. 18, 1985

[54] SPECTRALLY SENSITIZED SILVER HALIDE PHOTOTHERMOGRAPHIC MATERIAL

[75] Inventors: Larry D. Edwards; Frederick J. Sauter; George J. Burgmaier, all of Rochester, N.Y.

[73] Assignee: Eastman Kodak Company, Rochester, N.Y.

[21] Appl. No.: 544,043

[22] Filed: Oct. 24, 1983

[51] Int. Cl.³ ............................................. G03C 1/02
[52] U.S. Cl. .................................. 430/353; 430/588; 430/583; 430/584; 430/617; 430/618; 430/619; 430/620; 430/350
[58] Field of Search ............... 430/588, 583, 584, 617, 430/618, 619, 620, 350, 353

[56] References Cited

U.S. PATENT DOCUMENTS

| | | | |
|---|---|---|---|
| 2,503,776 | 4/1950 | Sprague | 96/140 |
| 3,424,586 | 1/1969 | Gotze | 96/106 |
| 3,438,776 | 4/1969 | Yudelson | 96/28 |
| 3,457,075 | 7/1969 | Morgan et al. | 96/67 |
| 3,660,102 | 5/1972 | Riester | 96/127 |
| 3,698,910 | 10/1972 | Sakazume et al. | 96/122 |
| 3,933,507 | 1/1976 | von Konig et al. | 96/67 |
| 4,105,451 | 8/1978 | Smith et al. | 96/66 |
| 4,197,131 | 4/1980 | Lea et al. | 430/617 |
| 4,220,709 | 9/1980 | deMauriac | 430/353 |

FOREIGN PATENT DOCUMENTS

| | | |
|---|---|---|
| 955964 | 4/1964 | United Kingdom . |
| 1542327 | 3/1979 | United Kingdom . |

OTHER PUBLICATIONS

*Product Licensing Index*, vol. 92, Dec. 1971, Publication No. 9232.
*Research Disclosure*, Dec. 1978, Item No. 17643; Jun. 1978, Item No. 17029.

Primary Examiner—Won H. Louie
Attorney, Agent, or Firm—Richard E. Knapp

[57] ABSTRACT

Photographic silver halide is spectrally sensitized by means of at least one bleachable spectral sensitizing dye comprising a cyanine dye nucleus and a particular N-methylene substituent. The spectrally sensitized photographic silver halide is useful in a photothermographic material. An image in the photothermographic material, after exposure, is developed and the spectral sensitizing dye is bleached, especially at elevated pH, by heating the photothermographic material to processing temperature.

19 Claims, 2 Drawing Figures

SPECTRALLY SENSITIZED SILVER HALIDE PHOTOTHERMOGRAPHIC MATERIAL

BACKGROUND OF THE INVENTION

1. Field of the Invention

This invention relates to photographic silver halide spectrally sensitized by means of at least one heat-bleachable spectral sensitizing dye comprising a cyanine dye nucleus and a particular N-methylene substituent. The invention also relates to a method of developing an image in the photographic silver halide and heat bleaching, especially at elevated pH, the spectral sensitizing dye.

2. Description of the State of the Art

Spectrally sensitized photographic silver halides in photothermographic materials and processes are well known, such as described in *Research Disclosure*, June, 1978, Item No. 17029. Spectral sensitizing dyes in such photothermographic materials can cause the materials to be colored. The resulting color remains in the processed material because the spectral sensitizing dyes are not removed from the photothermographic material during processing. The color from the spectral sensitizing dye imparts an objectionable background to the developed image in the photothermographic material. The problem caused by the presence of colored spectral sensitizing dyes is emphasized in photothermographic materials designed for dye chemical development because such photothermographic materials have higher concentrations of photographic silver halide and spectral sensitizing dyes than other photothermographic materials. It is desirable to be able to remove the color imparted by spectral sensitizing dyes to processed photothermographic materials.

We have found that certain classes of cyanine dyes are heat-bleachable, especially at elevated pH, and hence are decolorized during the heat development of the materials in which they are incorporated. These dyes are effective spectral sensitizers for photothermographic materials and are stable in such materials. While some acutance dyes used in photothermographic silver halide materials, such as those described in U.S. Pat. No. 4,197,131, are heat bleachable, they do not spectrally sensitize silver halide in such materials.

The term material herein, such as in photographic material, means photographic element and composition. For example, photothermographic materials herein mean photothermographic elements and photothermographic compositions.

SUMMARY OF THE INVENTION

It has been found that in a spectrally sensitized silver halide photothermographic material comprising photographic silver halide spectrally sensitized by means of at least one spectral sensitizing dye, improvements are provided by at least one spectral sensitizing dye that is a heat bleachable cyanine spectral sensitizing dye having the structure

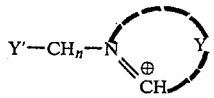

wherein Y' represents the atoms which cause the spectral sensitizing dye to be heat bleachable at processing temperature of the photothermographic element, such as atoms completing a sulfo, sulfato, or thiosulfato group; Y represents a moiety which completes a cyanine spectral sensitizing dye including, if necessary, an associated ion to maintain charge neutrality; and n is 1 or 2 based on the valence of Y'. The term cyanine herein includes cyanine and merocyanine. The spectral sensitizing dye is preferably capable of being bleached within 60 seconds, such as within about 2 to about 30 seconds, at a temperature within the range of about 80° C. to about 200° C., preferably at elevated pH, that is a pH of at least 8, preferably a pH within the range of about 9 to about 14. The heat bleachable spectral sensitizing dye is preferably selected from the group consisting of

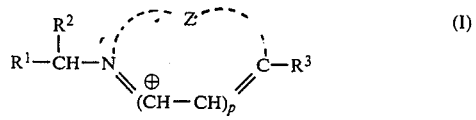

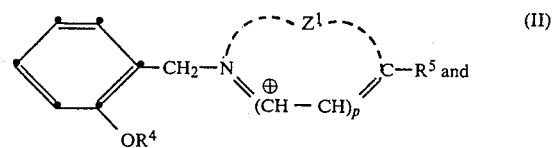

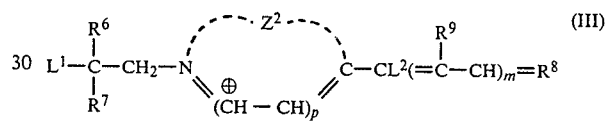

wherein $R^1$ is sulfo, sulfato, thiosulfato, cyano, arylsulfonyl, acyl or aroyl including naphthoyl;

$R^2$ is hydrogen or alkyl;

$R^3$, $R^5$, and $R^8$ are individually selected from moieties which complete cyanine spectral sensitizing dyes including, if necessary, an associated ion to maintain charge neutrality;

$R^4$ is hydrogen or acyl;

$R^6$ and $R^7$ are individually electronegative groups which are carboxy, sulfo and acyl;

$L^1$ and $L^2$ are hydrogen or taken together represent atoms required to complete an N-α alkylene bridge; and when $L^1$ and $L^2$ represent atoms required to complete an N-α alkylene bridge, then $R^6$ is hydrogen, alkyl or aryl, $R^7$ is hydroxy and p equals 0;

$R^9$ is hydrogen, alkyl or aryl;

Z, $Z^1$ and $Z^2$ are individually atoms necessary to complete a basic cyanine dye nucleus; and p and m are individually 0 or 1.

The photothermographic material is designed for dry chemical development or dry physical development. In the case of dry chemical development the photothermographic material comprises in addition to the components described above, (i) a silver halide developing agent and (ii) an activating concentration of an activator precursor. In the case of dry physical development the photothermographic material comprises in addition to the components described above, (i) an oxidation-reduction image-forming combination comprising (a) an organic metal salt oxidizing agent, with (b) an organic reducing agent for the organic metal salt oxidizing agent.

After exposure of the photothermographic material, an image is developed and the spectral sensitizing dye is changed to an essentially colorless compound by heating the photothermographic material to processing temperature, such as a temperature within the range of about 80° to about 200° C. The photothermographic material during processing preferably has an elevated pH, such as a pH within the range of about 8 to about 14. Elevated pH aids bleaching of the spectral sensitizing dye.

DETAILED DESCRIPTION OF THE INVENTION

Figure 1:
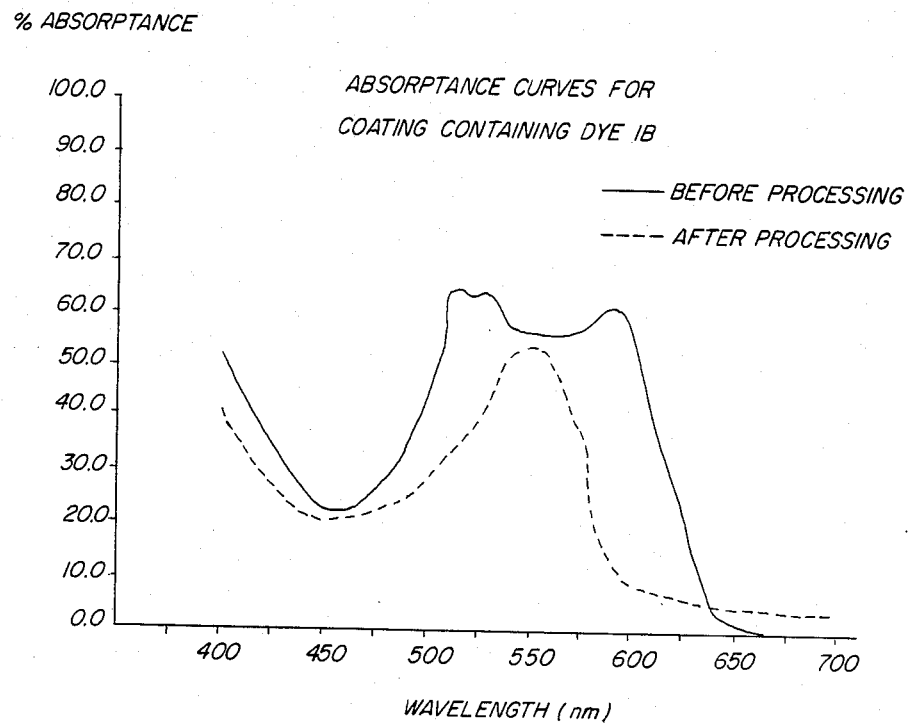

The compounds according to Formula I are prepared by a process wherein an intermediate betaine compound, such as a compound represented by the formula:

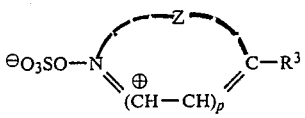

is reacted with an aldehyde, such as paraformaldehyde to produce a 1-sulfatoalkyl compound, such as a sulfatomethyl compound:

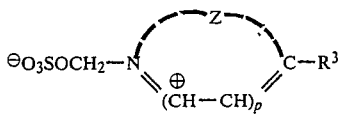

wherein Z, $R^3$ and p are as described above. The sulfatomethyl group on the resulting compound is converted to either a thiosulfato group or a sulfomethyl group by procedures known in the chemical art. A procedure is useful in which paraformaldehyde is replaced with other aldehyes which enable formation of 1-sulfoalkyl, 1-thiosulfatoalkyl and 1-sulfatoalkyl dye forming intermediates.

Optionally the described procedure for preparing compounds according to Formula I comprises adding liquid sulfur trioxide to an appropriate base in ethylene chloride at −5° C. to 0° C. under nitrogen. Sym-trioxane is optionally substituted for paraformaldehyde because the sym-trioxane is soluble in ethylene chloride. The following are examples of intermediate betaine compounds which are prepared by the described process starting with an appropriate heterocyclic nitrogen base:

1. anhydro 2-methyl-1-sulfatomethylnaphtho[1,2-d]thiazolium hydroxide;
2. anhydro 2-methyl-3-sulfatomethylbenzothiazolium hydroxide;
3. anhydro 5-chloro-2-methyl-3-sulfatomethylbenzothiazolium hydroxide;
4. anhydro 2-methyl-3-(1-sulfatobutyl)benzothiazolium hydroxide;
5. anhydro 5-chloro-2-methyl-3-(1-sulfatobutyl)benzothiazolium hydroxide.

The following betaine compounds are examples of intermediates which are 1-sulfoalkyl and 1-thiosulfatoalkyl compounds derived from the described 1-sulfatoalkyl compounds:

A. anhydro 2-methyl-3-thiosulfatomethylbenzothiazolium hydroxide is prepared by suspending anhydro 2-methyl-3-sulfatomethylbenzothiazolium hydroxide in a mixture of methanol and water. Sodium thiosulfate in water is added. All solids are dissolved. The product crystallizes upon stirring at room temperature (about 19° C.). The product has an infrared band at 1215 cm$^{-1}$;

B. anhydro 2-methyl-3-sulfomethylbenzothiazolium hydroxide is prepared by suspending anhydro 2-methyl-3-sulfatomethylbenzothiazolium hydroxide in liquid sulfur dioxide which contains triethylamine and water. The solution is maintained at −15° C. to −10° C. for two hours and then is allowed to evaporate. Ethyl alcohol is added and the solid product is filtered, washed with ethyl alcohol and dried. The product is purified, such as by recrystallization from water. The purified product has an infrared band at 1225 cm$^{-1}$;

C. anhydro 5-chloro-2-methyl-3-thiosulfatomethylbenzothiazolium hydroxide is prepared by adding anhydro 5-chloro-2-methyl-3-sulfatomethylbenzothiazolium hydroxide to a suspension of sodium thiosulfate in water. The reaction mixture is stirred for one hour at room temperature (about 19° C.). The product is collected, purified, such as by washing with water and then ether, and dried;

D. anhydro 5-chloro-2-methyl-3-(1-thiosulfatobutyl)benzothiazolium hydroxide is prepared by adding anhydro 2-methyl-3-(1-sulfatobutyl)benzothiazolium hydroxide to a suspension of sodium thiosulfate in water. The reaction mixture is stirred for one hour at room temperature (about 19° C.). The product is collected, purified, such as by washing with water and then ether, and dried;

E. anhydro 2-methyl-3-(1-thiosulfatobutyl)benzothiazolium hydroxide is prepared by adding anhydro 2-methyl-3-(1-sulfatobutyl)benzothiazolium hydroxide to a mixture of methanol and water (1:1 parts by volume). Sodium thiosulfate is added with stirring to the mixture. The mixture is stirred at about room temperature for about three hours. The product is then filtered off and purified, such as by washing with methanol and water, and dried;

F. anhydro 2-methyl-1-sulfomethylnaphtho[1,2-d]thiazolium hydroxide anhydro 2-methyl-1-sulfatomethylnaphtho[1,2-d]thiazolium hydroxide is suspended in a solvent mixture consisting of dimethylsulfoxide, liquid sulfur dioxide, triethylamine, and water. The solution is allowed to warm to room temperature (about 20° C.) over about 45 minutes and then is poured into ether. The supernatent ether layer is decanted and the residue is treated with a second portion of ether. After the ether is decanted, ethyl alcohol is added to the residues and the product is collected by filtration and purified, such as by washing with water and a small concentration of alcohol, then drying, and recrystallizing from a suitable solvent, such as an equal volume mixture of acetonitrile and water.

The intermediate betaine compounds are useful to prepare heat bleachable dyes according to the invention. The techniques and processes for preparing heat bleachable dyes according to the invention are known in the dye synthesis art. The procedures generally comprise mixing one of the intermediates with a second reactant in a solvent and heating the resulting composition until reaction completion. Examples of heat bleachable dyes, which are preferably bleachable at elevated pH, are as follows:

anhydro 3′-ethyl-1-sulfatomethylnaphtho[1,2-d]-thiazolothiacarbocyanine hydroxide;
anhydro 3′-ethyl-1-sulfatomethylnaphtho[1,2-d]-thiazolooxacarbocyanine hydroxide;
anhydro 3′-ethyl-1-sulfomethylnaphtho[1,2-d]-thiazolooxacarbocyanine hydroxide;
anhydro 3-ethyl-3′-sulfatomethyloxathiacarbocyanine hydroxide;
anhydro 3-ethyl-3′-thiosulfatomethyloxathiacarbocyanine hydroxide;
anhydro 3-ethyl-3′-sulfomethyloxathiacarbocyanine hydroxide;
anhydro 5-chloro-3-ethyl-3′-(1-sulfatobutyl)oxathiacarbocyanine hydroxide;
anhydro 3-ethyl-3′-(1-thiosulfatobutyl)oxathiacarbocyanine hydroxide;
anhydro 9-ethyl-3-methyl-3′-(1-thiosulfatobutyl)oxathiacarbocyanine hydroxide;
anhydro 3,3′-dithiosulfatomethylthiacarbocyanine hydroxide;*
anhydro 9-methyl-3,3′-dithiosulfatomethylthiacarbocyanine hydroxide;*
anhydro 9-ethyl-3,3′-dithiosulfatomethylthiacarbocyanine hydroxide;*
anhydro 3,3′-bis(1-thiosulfatobutyl)thiacarbocyanine hydroxide ethyl diisopropyl amine salt;
anhydro 5,5′-dichloro-3,3′-dithiosulfatomethylthiacarbocyanine hydroxide;*
anhydro 5,5′-dichloro-3,3′-bis(thiosulfatobutyl)thiacarbocyanine hydroxide;*

*pyridine salt.

The compounds according to Formula II are prepared by first preparing an intermediate quaternary salt. This intermediate quaternary salt is prepared by heating a heterocyclic base represented, for example, by the formula:

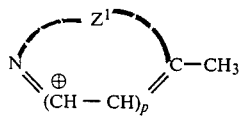

with an alkylating agent represented, for example, by the formula:

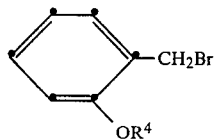

to yield an intermediate quaternary salt, for instance, represented by the formula:

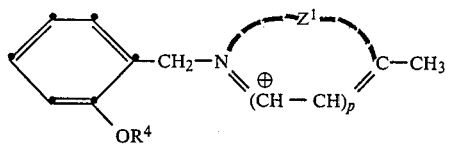

wherein $Z^1$, p and $R^4$ are as defined above. Such an intermediate quaternary salt is condensed by procedures known in the organic synthesis art to yield dyes within Formula II.

An illustrative preparation of a heterocyclic base is preparation of 3-(2-acetoxybenzyl)-2-methylbenzothiazolium bromide:

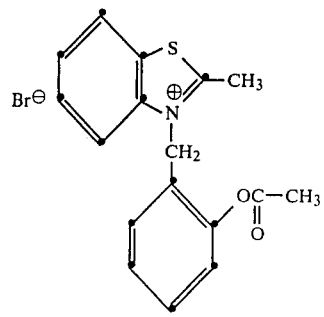

To prepare this heterocyclic base, 2-methylbenzothiazole (7.45 g, 0.05 moles) and 1-acetoxy-2-bromomethylbenzene (freshly distilled) (11.3 g, 0.05 moles) are mixed together and heated at 140° C. for 16 hours. The mass is cooled, stirred with acetone and the solid filtered off.

The alkylating agent which is, for example, 1-acetoxy-2-bromomethylbenzene is prepared, for example, as follows:

2-acetoxytoluene (75 g, 0.5 moles) and N-bromosuccinimide (89 g, 0.6 moles) are suspended in carbon tetrachloride and heated to refluxing temperature. Catalytic quantities of benzoyl peroxide and azobisisobutyrylnitrile are added to initiate the reaction. Bromine may also be added to start the reaction. Refluxing is continued for 45 minutes. The reaction mixture is filtered while hot, and the filtrate distilled under reduced pressure. A forerun is collected over the range from 52° to 96° C. at 0.25 mm. The product was collected at 96°–100° C. at 0.15 to 0.25 mm pressure.

An illustrative dye within Formula II is as follows:
3-(2-acetoxybenzyl)-3′-ethyl-9-methylthiacarbocyanine tetrafluoroborate

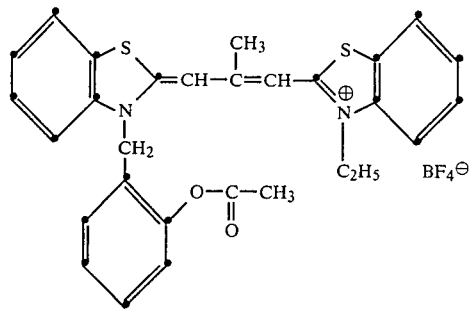

This dye is illustrated in a resonance form and is prepared as follows:

3-(2-acetoxybenzyl)-2-methylbenzothiazolium bromide (0.76 g, 0.002 moles) and 2-(2-chloropropenyl)-3-ethylbenzothiazolium chloride (0.55 g, 0.002 moles) are dissolved in methanol (15 ml). Triethylamine (0.5 ml) is added and the solution refluxed for a few minutes. After cooling tetrabutylammonium tetrafluoroborate (0.66 g) is added. The dye precipitates from the solution. It is filtered off and recrystallized from methanol containing a trace of acetic acid.

Examples of heat bleachable dyes within Formula II are as follows:

3'-(2-acetoxybenzyl)-1-ethylnaphtho[1,2-d]thiazolothiacyanine bromide

Anhydro-3'-(2-carboxybenzyl)-1-ethylnaphtho[1,2-d]thiazolothiacyanine hydroxide 3-(2-acetoxybenzyl)-3'-ethyl-9-methylthiacarbocyanine tetrafluoroborate 3,3'-bis(2-acetoxybenzyl)thiacarbocyanine tetrafluoroborate Anhydro-3-(2-acetoxybenzyl)-3'-(3-sulfopropyl)-9-methyl thiacarbocyanine hydroxide 3-(2-hydroxybenzyl)thiacarbocyanine trifluoroacetate 3,3'-bis(2,5-dihydroxybenzyl)thiacarbocyanine perchlorate 1,1'-bis(2-acetoxybenzyl)-3,3'-diethylbenzimidazolocarbocyanine iodide 1-(2-acetoxybenzyl)-1',3-diethylbenzimidazolonaphtho[1,2-d]-thiazolocarbocyanine p-toluenesulfonate 1-(2-acetoxybenzyl)-3,3'-diethylbenzimidazolooxa carbocyanine iodide 3'-(2-acetoxybenzyl)-3-ethylthiathiazolocarbocyanine iodide The compounds according to Formula III are prepared by reacting an intermediate betaine with an appropriate starting material by procedures known in dye synthesis art. For example, an intermediate betaine, such as

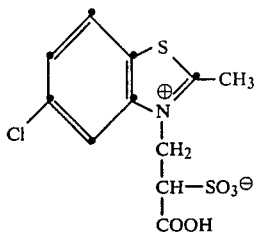

is prepared by alkylation of an appropriate base, such as

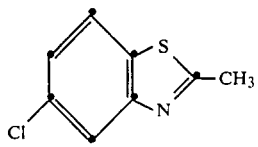

with 3-chloro-2-sulfopropionic acid, such as by the general method described by A. LeBerre, A. Etienne and J. Coquelin in Bull. Soc. Chim. Fr., 2266 (1973). The potassium salt of the dye is water soluble but the acid form exhibits little water solubility. The solubility of the dye varies greatly when pH is changed within the range of about 4 to 6.

The intermediate betaine, designated herein as Reactant A, for preparation of dyes within Formula III is further illustrated by the following compounds and preparations:

A. anhydro 1-(2-carboxy-2-sulfoethyl)-5,6-dichloro-3-ethyl-2-methylbenzimidazolium hydroxide is prepared by dissolving 5,6-dichloro-1-ethyl-2-methylbenzimidazole in methanol and adding the resulting solution to 3-chloro-2-sulfopropionic acid. The resulting mixture is refluxed for two hours during which a solid slowly separates. After chilling, the solid is filtered off, and purified, such as by washing with methanol and dried;

B. anhydro 1-(2-carboxy-2-sulfoethyl)-4-methylquinolinium hydroxide is prepared by the same procedure as in A. for preparation of anhydro 1-(2-carboxy-2-sulfoethyl)-5,6-dichloro-3-ethyl-2-methylbenzimidazolium hydroxide except that 4-methylquinoline replaces 5,6-dichloro-1-ethyl-2-methylbenzimidazole;

C. anhydro 3-(2-carboxy-2-sulfoethyl)-5-chloro-2-methylbenzothiazolium hydroxide is prepared by the same procedure as in A. for the preparation of anhydro 1-(2-carboxy-2-sulfoethyl)-5,6-dichloro-3-ethyl-2-methylbenzimidazolium hydroxide except that 5-chloro-2-methyl-benzothiazole replaces 5,6-dichloro-1-ethyl-2-methylbenzimidazole;

D. anhydro 3-(2-carboxy-2-sulfoethyl)-5-methoxy-2-methylbenzothiazolium hydroxide is prepared by mixing 5-methoxy-2-methylbenzothiazole and 3-chloro-2-sulfopropionic acid. The resulting mixture is heated at 100° C. for one hour. The reaction mixture is dissolved in warm methanol and the solution diluted with ether. The ether layer is decanted and the residue taken up in warm methanol. The product separates upon standing;

E. anhydro 3-(2-carboxy-2-sulfoethyl)-2-methylbenzothiazolium hydroxide is prepared by a process like that described in D. except that 2-methylbenzothiazole replaces 5-methoxy-2-methylbenzothiazole.

The Reactant A is reacted with a heterocyclic base moiety, designated Reactant B, that completes the desired dye. Examples of Reactant B are as follows:

2-(2-acetanilidovinyl)-5,6-dichloro-1,3-diethylbenzimidazolium iodide;

2-(2-acetanilidovinyl)-3-ethylbenzoxazolium iodide;

2-(2-acetanilidovinyl)-1-ethylnaphtho[1,2-d]thiazolium p-toluene-sulfonate;

anhydro 3-ethyl-2-sulfobenzothiazolium hydroxide;

2-(2-acetanilidovinyl-3-ethylbenzoselenazolium)iodide;

5-chloro-3-ethyl-2-(2-methoxy-1-butenyl)benzothiazolium fluorosulfate;

2-(2-chloropropen-1-yl)-3-ethyl-5-methoxybenzothiazolium fluoroborate.

Spectral sensitizing dyes within Formula III are prepared by the following illustrative procedure: A 2-carboxy-2-sulfoethyl substituted betaine (Reactant A) as described above, is suspended in boiling methanol. A second reactant (Reactant B) and then a base, such as triethylamine, are added in order. The mixture is heated at reflux with stirring for one minute. The solution is then acidified with acetic acid and cooled to room temperature. The dye is precipitated and filtered off. The dye is generally purified, such as by washing with methanol and redissolving in methanol containing triethylamine. The solution is treated with a solution of a salt, such as sodium iodide, which causes the salt of the dye to separate. It is filtered off, stirred with acetone and filtered off again.

Examples of spectral sensitizing dyes within Formulas (I) and (II) comprise dyes wherein $R^3$ and $R^5$ are, for example, individually:

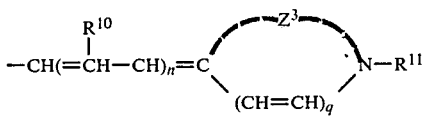

wherein $R^{10}$ is hydrogen, alkyl, including cycloalkyl, such as alkyl containing 1 to 20 carbon atoms, preferably 1 to 6 carbon atoms, or aryl, such as aryl containing 6 to 20 carbon atoms.

$R^{11}$ is alkyl, such as alkyl containing 1 to 20 carbon atoms, or a heterocyclic group such as a 5 or 6 member heterocyclic group including, for example, an imidazole or benzothiazole group;

$Z^3$ represents the atoms necessary to complete a basic cyanine dye nucleus, such as a benzimidazolocarbocyanine, thiacarbocyanine or thiacyanine nucleus; and q is 0 or 1.

Examples of dyes within Formula III are: Anhydro 1-(2-carboxy-2-sulfoethyl)-5,5',6,6'-tetrachloro-1',3,3'-triethylbenzimidazolocarbocyanine hydroxide, sodium salt

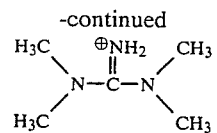

Anhydro 1'-(2-carboxy-2-sulfoethyl)-3-ethylthia-4'-cyanine hydroxide, sodium salt

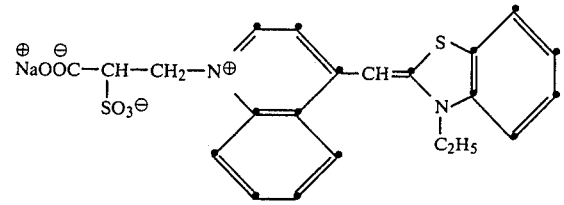

Anhydro 1'-(2-carboxy-2-sulfoethyl)-3-ethylselena-4'-carbocyanine hydroxide, sodium salt

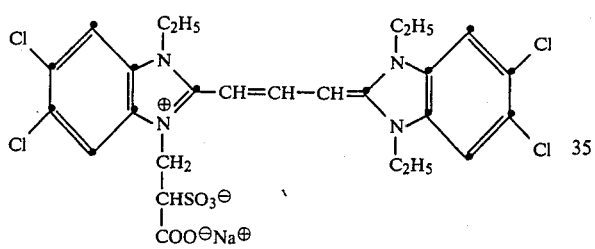

Anhydro 1-(2-carboxy-2-sulfoethyl)-5,6-dichloro-3,3'-diethylbenzimidazolooxacarbocyanine hydroxide, potassium salt Anhydro 3-(2-carboxy-2-sulfoethyl)-5,5'-dichloro-3',9-diethylthiacarbocyanine hydroxide, potassium salt Anhydro 1-(2-carboxy-2-sulfoethyl)-5,6-dichloro-1',3-diethylbenzimidazolonaphtho[1,2-d]-thiazolocarbocyanine hydroxide, 1,1,3,3-tetramethylguanidine salt

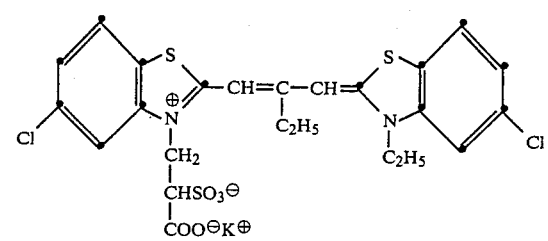

Anhydro 3-(2-carboxy-2-sulfoethyl)-3'-ethyl-5,5'-dimethoxy-9-methylthiacarbocyanine hydroxide, potassium salt

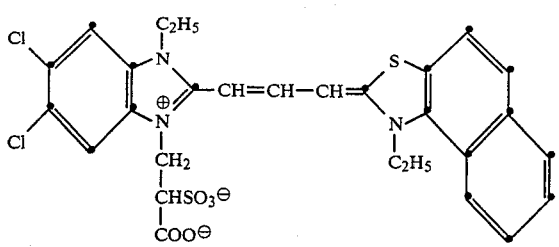

Anhydro 3-(2-carboxy-2-sulfoethyl)-3'-ethyl-9-methylthiacarbocyanine hydroxide, potassium salt

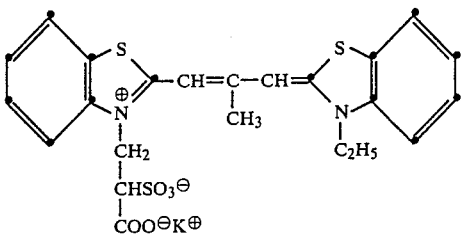

The photothermographic material according to the invention comprises a photosensitive component consisting essentially of photosensitive silver halide. The photosensitive silver halide is preferably in the form of a hydrophilic photosensitive silver halide emulsion containing a gelatino peptizer. The photosensitive silver halide is especially useful due to its high degree of photosensitivity. Preferred photosensitive silver halides are silver chloride, silver bromoiodide, silver bromide, silver chlorobromoiodide or mixtures thereof. For purposes of the invention, silver iodide is also considered to be a photosensitive silver halide. A range of grain size of photosensitive silver halide from very coarse grain to very fine grain silver halide is useful.

Photographic silver halide emulsions according to the invention are prepared by any of the procedures known in the photographic art which involve preparation of photographic silver halide gelatino emulsions. Useful procedures and forms of photosensitive silver halide emulsions are described in for example, the Product Licensing Index, Volume 92, December 1971, Publication No. 9232 and Research Disclosure, December 1978, No. 17643, the disclosures of which are incorporated herein by reference. The silver halide emulsions can include, for example, silver halide grains bounded by 100, 111 or 110 crystal plains and are prepared by techniques including single jet, double jet (including continuous removal techniques), accelerated flow rate and interrupted precipitation techniques. Sensitizing compounds such as compounds of copper, thalium, lead, bismuth, cadmium and Group VIII noble metals are useful during precipitation to provide increased sensitivity. The silver halide is either monodispersed or polydispersed as precipitated. The grain size distribution of the silver halide is controlled by silver halide grain separation techniques or by blending silver halide emulsions of different grain sizes. Useful silver halide emulsions include Lippman emulsions and ammoniacal emulsions, excess halide ion ripened emulsions, thiocyanate ripened emulsions, thioether ripened emulsions, or emulsions containing weak silver halide solvents such as ammonium salts. The silver halide emulsions are surface sensitive emulsions, that is emulsions that form latent images primarily on the surfaces of the silver halide grains, or internal latent image forming emulsions, that is emulsions that form latent images predominantly in the interior of the silver halide grains. The silver halide emulsions are negative working emulsions such as surface sensitive emulsions or unfogged internal latent image forming emulsions, or direct positive emulsions of the surface fogged type or of the unfogged internal latent image forming type which are positive working with fogging development. Blends of surface sensitive emulsions and internally fogged internal latent image forming emulsions are also useful. Tabular grain photosensitive silver halide emulsions are also useful.

The silver halide emulsions according to the invention are unwashed or washed to remove soluble salts. They are also chemically sensitized by compounds and procedures described in, for example, Research Disclosure, December 1978, Item No. 17643, paragraph IIIA, the description of which is incorporated herein by reference.

The spectral sensitizing dyes according to the invention are useful in a range of concentrations in a photographic silver halide material. Selection of an optimum concentration of spectral sensitizing dye or combination of dyes depends upon such factors as the particular photographic silver halide, processing conditions, desired image and other components in the photographic material. Preferably the concentration of spectral sensitizing dye or combination of dyes is within the range of about 5 to about $50 \times 10^{-4}$ moles of spectral sensitizing dye or combination of dyes per mole of silver in the photographic material.

The term "hydrophilic" herein means that the photosensitive silver halide emulsion contains a hydrophilic peptizer, preferably a gelatino peptizer, that is compatible with an aqueous solvent.

A gelatino peptizer is useful with the photosensitive silver halide emulsion. A variety of gelatino peptizers are useful for this purpose. The gelatino peptizer is, for example, phthalated gelatin or nonphthalated gelatin. Other gelatino peptizers that are useful include acid or base hydrolyzed gelatins. A nonphthalated gelatin peptizer is preferred in photothermographic silver halide materials.

The silver halide photographic material generally has a pH within the range of about 5.0 to about 6.2 during the emulsion precipitation. Lower pH values tend to cause undesired coagulation and higher pH values tend to cause undesirable grain growth.

The temperature range and duration of preparation of the silver halide emulsion are altered to produce the desired emulsion grain size and distribution as well as the desired composition properties. The silver halide emulsion is prepared by means of emulsion preparation techniques and apparatus known in the photographic art.

A variety of binders are useful in the described photographic materials according to the invention. The binders include various colloids alone or in combination as vehicles and/or binding agents. The binders that are useful include transparent or transluscent materials. Useful binders include, for example, hydrophilic materials, such as gelatin and other hydrophilic polymers that do not adversely affect spectral sensitization and other desired properties of the photographic material. If desired, hydrophobic materials such as hydrophobic binders which are transparent or transluscent are useful in the photographic material. Such useful binders include polymers of alkylacrylates and methacrylates, acrylic acid, sulfoalkylacrylates and methacrylates and those which have crosslinking sites that faciliate hardening or curing. Other useful hydrophobic binders include high molecular weight materials and resins, such as poly(vinylbutyral), cellulose acetate butyrate, poly(methylmethacrylate), poly(styrene), poly(vinyl chloride), chlorinated rubber, poly(isobutylene), butadienestyrene copolymers, vinyl chloride-vinyl acetate copolymers and copolymers of vinyl acetate, vinyl chloride and maleic anhydride. It is important that the hydrophobic binder not adversely affect the sensitometric or other desired properties of the photothermographic material according to the invention. Poly(vinylbutyral) is preferred. This is available under the tradename "BUTVAR" available from The Monsanto Company, U.S.A.

If desired, a portion of the photographic silver halide according to the invention is prepared in situ in the photothermographic material. The photothermographic composition, for example, can contain a portion of the photographic silver halide prepared in or on one or more of the other components of the photothermographic material rather than prepared separate from the described components and then admixed with them. Such a method of preparing silver halide in situ is described in, for example, U.S. Pat. No. 3,457,075, the disclosure of which is incorporated herein by reference.

Photothermographic materials in which the spectral sensitizing dyes according to the invention are useful are described in, for example, *Research Disclosure,* June 1978, Item 17029, the description of which is incorporated herein by reference. Such photothermographic materials include, for example, those designed for dry physical development or those designed for dry chemical development. The photothermographic materials designed for dry chemical development are preferred. Such photothermographic materials designed for dry chemical development generally comprise photographic silver halide as the sole source of image forming metallic silver. Generally such photothermographic materials are based on an aqueous system comprising on a suitable support, in reactive association, photographic silver halide with a silver halide reducing or developing agent, an activator or activator stabilizer, in a vehicle or binder with a stabilizer or stabilizer precursor that provides a stable image upon thermal processing. Each of these components is known in the photothermographic art and is described in, for example, *Research Disclosure,* June, 1978, Item No. 17029.

A melt-forming compound is useful in a photothermographic material according to the invention. The melt-forming compound often provides an improved developed image. The term "melt-forming compound" herein means a compound which upon heating to the described processing temperature produces an improved reaction medium, typically a melt medium, within which the described image forming combination and photosensitive component produce better image development. The exact nature of the reaction medium in the photothermographic material at processing temperatures is not fully understood; however, it is believed that at reaction temperature a melt occurs which permits the reaction components to better interact and form a desired image. Useful melt-forming compounds are generally separate components from the image forming combinations, although the image forming combination and other addenda in the photothermographic material may enter into the melt formation. Generally useful melt-forming compounds are amides, imides, cyclic ureas and triazoles which are compatible with other components of the photothermographic material. Useful melt-forming compounds are selected, for example, from those described in, for instance, U.S. Pat. No. 3,438,776, the description of which is incorporated herein by reference. Examples of useful melt-forming compounds include acetamide, 1,3-dimethylurea, 2-pyrrolidone and formamide.

A melt-forming compound is useful in a range of concentrations in the photothermographic materials according to the invention. The optimum concentration of melt-forming compound will depend upon such factors as the particular photothermographic material, desired image, particular sensitizing dye, processing conditions and particular binder.

The photothermographic materials according to the invention generally comprise other addenda which are useful in providing a desired image, such as development modifiers that function as speed increasing compounds, hardeners, plasticizers and lubricants, coating aids, brighteners, absorbing and filter dyes, antistatic materials or layers, antifoggants and other addenda, such as described in the above *Research Disclosure* and Product Licensing Index publications, the descriptions of which are incorporated herein by reference.

Useful photothermographic materials according to the invention include those that comprise dye forming couplers. In such materials it is desired to have a reducing agent which in its oxidized form reacts with the coupler to form a desired dye. It is necessary that the dye forming coupler be in a location with respect to the oxidized form of the reducing agent upon processing to enable formation of the desired dye upon heating the photothermographic material. One illustrative class of dye forming couplers comprise resorcinol dye forming couplers. Examples of such resorcinol couplers include 2',6'-dihydroxytrifluoroacetanilide and 2,6-dihydroxyacetanilide and other resorcinolic couplers described in *Research Disclosure,* Vol. 173, September, 1978, Item No. 17326. Other useful dye forming couplers are described in, for example, U.S. Pat. No. 3,531,286 and U.S. Pat. No. 3,761,270, the description of which is incorporated herein by reference.

It is very advantageous in photothermographic materials according to the invention to include a heat sensitive base release agent, also known as a base precursor. A base release agent herein means a compound which upon heating in the photothermographic material produces a more effective reaction between the photosensitive silver halide and silver halide developing agents, and causes an elevation of pH of the photothermographic material containing the spectral sensitizing dye to enable bleaching of the dye within a shorter time. Elevated pH in the photothermographic material such as a pH within the range of about 8 to about 14, during thermal processing is highly preferred for aiding bleaching of the spectral sensitizing dye. Examples of useful heat sensitive base release agents are aminimide base release agents, such as described in *Research Disclosure,* May 1977, Item Nos. 15733, 15732, 15776 and 15734; guanidinium compounds, such as guanidinium trichloroacetate; certain amides, such as N,N-diethyl-1-imidazolecarbonamide; and other compounds which are known to release a base moiety but do not adversely affect the desired sensitometric properties of photographic silver halide.

The preferred concentration of base release agent is generally within the range of about 0.25 to about 2.5 moles of base release agent per mole of photographic silver halide in the photothermographic material. The optimum concentration of heat sensitive base release agent will depend upon such factors as the desired image, particular reducing agent, particular sensitizing dye, particular photosensitive component and processing conditions.

The photothermographic elements according to the invention comprise a variety of supports which withstand the processing temperatures useful in developing an image. Preferred supports include, for example, cellulose ester, poly(vinyl acetal), poly(ethylene terephthalate), polycarbonate and polyester film supports. Related film and resinous support materials as well as paper, glass, metal and like supports which can withstand processing temperatures are also useful. Generally a flexible support is most useful.

The photothermographic compositions are coated on a suitable support by coating procedures known in the photographic art including, for example, dip coating, air knife coating, curtain coating or extrusion coating using hoppers. If desired, two or more layers are coated simultaneously.

It is necessary that the photographic silver halide as well as other components necessary for imaging be "in reactive association" with each other in order to produce the desired image. The term "in reactive association" herein means that the photographic silver halide and other necessary components for imaging are in a location with respect to each other which enables the desired imaging, processing and production of a useful image.

A variety of imagewise exposure means are useful for imagewise exposing the photothermographic materials according to the invention. The imaging means according to the invention includes any suitable source of radiation to which the photothermographic material is sensitive. The imaging materials are generally sensitive to the ultraviolet and blue regions of the spectrum, however, the spectral sensitizing dyes according to the invention spectrally sensitize the photographic silver halide to other regions of the electromagnetic spectrum. Exposure means which provide the appropriate radiation based on spectral sensitization of the photographic silver halide are preferred. Generally a photothermographic material according to the invention is exposed imagewise with a visible light source, such as a tungsten lamp. Other sources of radiation are useful and include, for instance, lasers, electron beams and x-ray sources. The photothermographic materials are generally exposed imagewise to produce a developable latent image.

A visible image is developed in a photothermographic material according to the invention within a short time, such as within several seconds, merely by heating the photothermographic material to moderately elevated temperatures. For example, the exposed photothermographic material is heated to a temperature within the range of about 80° C. to about 200° C., such as a temperature within the range of about 100° C. to about 180° C. The heating step also enables the spectral sensitizing dyes according to the invention to be bleached. Heating is carried out until a desired image is developed and the desired degree of bleaching of the spectral sensitizing dye occurs, typically within about 2 to about 30 seconds, such as about 2 to about 10 seconds. Selection of an optimum processing time and temperature will depend upon such factors as the desired image, the particular sensitizing dye or dye combination and other components of the photothermographic material.

A variety of means are useful to produce the necessary heating of the photothermographic material to develop the desired image and enable bleaching of the spectral sensitizing dyes according to the invention. The heating means is, for example, a simple hot plate, iron, roller, heated drum, infrared heating means, hot air heating means or the like.

Processing according to the invention is generally carried out under ambient conditions of pressure and humidity. Pressures and humidity outside normal atmospheric conditions are useful if desired, however atmospheric conditions are preferred.

The following examples are included for a further understanding of the invention.

EXAMPLE 1

The following examples help illustrate that dyes within the scope of the invention are useful to spectrally sensitize a gelatino photographic silver halide emulsion.

The dyes in the following table were included in a 0.2 μm sulfur and gold sensitized, monodispersed silver bromoiodide photographic emulsion containing 2.5 mole iodide. The dyes were added to separate portions of the emulsions at the concentrations indicated in the table. The resulting mixtures were coated on a cellulose ester support to produce a silver coverage of 1.07 grams per square meter of support. A sample of each coating was exposed in a commercial spectral sensitometer to a quartz-halogen light source through a Wratten 30 B color correcting filter, diffraction grating with filters to remove second order transmission and a superimposed step wedge. (Wratten is a trademark of Eastman Kodak Co., U.S.A.) The resulting exposed samples were developed in a commercial roller transport processor for 80 seconds at 23° C. in a silver halide developer comprising N-methyl-p-aminophenol sulfate and hydroquinone, then fixed, washed with water and dried. A density versus log exposure curve (D log E) was prepared for each sample at 400 nanometers and at each 10 nanometer interval between 400 nanometers and 700 nanometers. The speed at 0.3 density unit above fog was read from each D log E curve, adjusted for a uniform energy distribution over the spectral range and plotted against wavelength to obtain a relative log spectral sensitivity curve. The sensitizing maximum wavelength was determined for each dye from this curve. The results are given in the following table:

EXAMPLES 2-19

TABLE 1

| Ex. | Dye | Level (× 10$^{-4}$) (Moles Dye per mole Ag) | Relative 400 nm Speed | Sensitizing max (nm) | Second max (nm) | Sensitizing Range |
|---|---|---|---|---|---|---|
| | Control* | — | 100 | — | — | to 490 |
| 2 | anhydro 1-sulfomethyl-3'-ethyl naphtho[1,2-d]-thiazolooxacarbocyanine hydroxide | 8.0 | 141 | 550 | 610 | 490–680 |
| 3 | anhydro 3'-ethyl-1-sulfatomethyl-naphtho[1,2-d]thiazolothiacarbocyanine hydroxide | 8.0 | 110 | 580 | 540 | 490–620 |
| 4 | anhydro 3'-ethyl-1-sulfomethylnaphtho[1,2-d]thiazolooxacarbocyanine hydroxide | 8.0 | 112 | 550 | 520 | 490–600 |
| 5 | anhydro 3-ethyl-3'-sulfatomethyl- | 8.0 | 118 | 560 | — | 480–610 |

TABLE 1-continued

| Ex. | Dye | Level (× 10⁻⁴) (Moles Dye per mole Ag) | Relative 400 nm Speed | Sensitizing max (nm) | Second max (nm) | Sensitizing Range |
|---|---|---|---|---|---|---|
| 6 | anhydro 9-ethyl-3-methyl-3'-(1-thiosulfatobutyl)oxathiacarbocyanine hydroxide | 2.0 | 170 | 610 | — | 500–650 |
| 7 | anhydro 3,3'-dithiosulfomethyl-thiacarbocyanine hydroxide | 6.0 | 204 | 540 | 590 | 490–670 |
| 8 | anhydro 9-methyl-3,3'-dithiosulfatomethylthiacarbocyanine hydroxide | 6.0 | 135 | 600 | — | 500–660 |
| 9 | anhydro-3-ethyl-3'-(1-thiosulfatobutyl)thiacarbocyanine hydroxide | 6.0 | 170 | 640 | 590 | 520–680 |
| 10 | anhydro 5'-chloro-3-ethyl-3'-(1-sulfatobutyl)oxathiacarbocyanine hydroxide | 8.0 | 282 | 560 | — | 490–620 |
| 11 | anhydro 3-ethyl-3'-(1-thiosulfatobutyl)oxathiacarbocyanine hydroxide | 8.0 | 214 | 570 | — | 480–620 |
| 12 | anhydro 9-ethyl-3,3'-dithiosulfatomethylthiacarbocyanine hydroxide* | 6.0 | 276 | 610 | — | 500–660 |
| 13 | anhydro 5,5'-dichloro-3,3'-bis(1-thiosulfatobutyl)thiacarbocyanine hydroxide | 6.0 | 263 | 600 | — | 490–660 |
| 14 | anhydro 3-ethyl-3'-sulfomethyloxathiacarbocyanine hydroxide | 8.0 | 407 | 560 | 520 | 490–600 |
| 15 | anhydro 3,3'-bis(1-thiosulfatobutyl)-thiacarbocyanine hydroxide ethyl diisopropyl amine salt | 2.0 | 123 | 610 | — | 570–630 |
| 16 | anhydro 5,5'-dichloro-3,3'-dithiosulfatomethylthiacarbocyanine hydroxide | 8.0 | 141 | 610 | — | 520–650 |
| 17 | anhydro 3'-ethyl-1-sulfatomethyl-naphtho[1,2-d]thiazolooxacarbocyanine hydroxide | 8.0 | 200 | 580 | 540 | 470–630 |
| 18 | anhydro 3-ethyl-3'-thiosulfatomethyl-oxathiacarbocyanine hydroxide | 8.0 | 186 | 560 | 520 | 470–600 |

*Control contains no dye

Other examples of heat bleachable dyes are as follows:
Anhydro-3-ethyl-3'-(1-thiosulfatobutyl)thiacarbocyanine hydroxide
1,3-Diethyl-5-[(3-sulfatomethyl-2-benzothiazolinylidene)butadienylidene]-2-thiobarbuturic acid, pyridine salt

EXAMPLES 19–25

The following examples help further illustrate that dyes within the scope of Formula III are useful to spectrally sensitize a gelatino photographic silver halide emulsion.

The procedure for these examples was the same as for Examples 2 to 19 except that a Wratten 80 B color correcting filter replaced a Wratten 30 B filter. The results are given in the following table:

TABLE 2

| Ex. | Dye | Level (moles Dye/mole Ag) | Relative 400 nm Speed | Sensitizing maximum (m) | Sensitizing Range (nm) |
|---|---|---|---|---|---|
|  | Undyed |  | 100 | — | to 490 |
| 19 | anhydro 1-(2-carboxy-2-sulfoethyl)-5,5',6,6'-tetrachloro-1',3,3'-triethylbenzimidazolocarbocyanine hydroxide, sodium salt | 8.0 × 10⁴ | 110 | 570 | 480–600 |
| 20 | anhydro 1-(2-carboxy-2-sulfoethyl)-5,6-dichloro-1,3'-diethylbenzimidazolooxacarbocyanine hydroxide, potassium salt | 8.0 × 10⁴ | 224 | 540 | 460–590 |
| 21 | anhydro 1-(2-carboxy-2-sulfoethyl)-5,6-dichloro-3,3'-diethylbenzimidazolonaphtho[1,2-d]thiazolocarbocyanine hydroxide, 1,1,3,3-tetramethylguanidine salt | 6.0 × 10⁴ | 148 | 600 | 470–660 |
| 22 | anhydro 1'-(2-carboxy-2-sulfoethyl)-3-ethylthia-4'-cyanine hydroxide, sodium salt | 8.0 × 10⁴ | 123 | 550 | 490–580 |
| 23 | anhydro 1'-(2-carboxy-2-sulfoethyl)-3-ethylselena-4'-carbocyanine hydroxide, sodium salt | 2.0 × 10⁴ | 126 | 670 | 570–720 |
| 24 | anhydro 3-(2-carboxy-2-sulfoethyl)-5,5'-dichloro-3',9-diethylthiacarbocyanine hydroxide, potassium salt | 6.0 × 10⁴ | 145 | 650 | 490–700 |
| 25 | anhydro 3-(2-carboxy-2-sulfoethyl)-3'-ethyl-5,5'-dimethoxy-9-methylthiacarbo- | 8.0 × 10⁴ | 102 | 550 | 470–670 |

TABLE 2-continued

| Ex. | Dye | Level (moles Dye/ mole Ag) | Relative 400 nm Speed | Sensitizing maximum (m) | Sensitizing Range (nm) |
|---|---|---|---|---|---|
| | cyanine hydroxide, potassium salt | | | | |

EXAMPLES 26-96

The dyes in the following Tables 3 to 12 were added as spectral sensitizers to a 0.14 micron chemically unsensitized gelatino silver bromoiodide emulsion containing 2.5 mole % iodide. The dyes were added to separate portions of the emulsion at a concentration of $22.5 \times 10^{-4}$ moles/mole of silver and the emulsions were heated at 50° C. for ten minutes. A portion of a gelatin melt containing the following:

(a) 2,2'-(ethylenebiscarbamoyl)benzoic acid (melt forming compound)

(b) 2,2'-(trimethylenediamino)bis(2-thiazoline)(stabilizer precursor)

(c) 2,2'-[urylenebis(ethylenethio)]bis(2-imidazoline) (base precursor)

(d) 4-hydroxymethyl-4-methyl-1-phenyl-3-pyrazolidinone (developing agent)

was added and the resulting emulsions were coated to obtain silver coverage of 1.40 grams/m² of silver on a poly(ethyleneterephthalate) film support. This produced a photothermographic film according to the invention.

A sample of each coating was exposed in a commercial spectral sensitometer to a quartz-halogen light source through a Wratten 80 B color correcting filter, a diffraction grating with filters to remove second order transmission and a superposed step wedge to produce a developable latent image. The exposed coatings were developed by uniformly heating them on a heated block at 180° C. for 10 seconds. All of the dyes in the following Tables were spectral sensitizers in the coatings. All the spectral sensitizing dyes in the coatings were bleached or nearly decolorized during thermal processing. Evaluation was done visually with the unaided eye.

TABLE 3

Dyes With N(2-Carboxy-2-sulfoethyl) Substituents

Example 26:

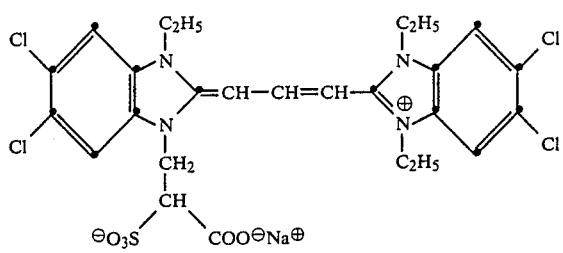

Example 27:

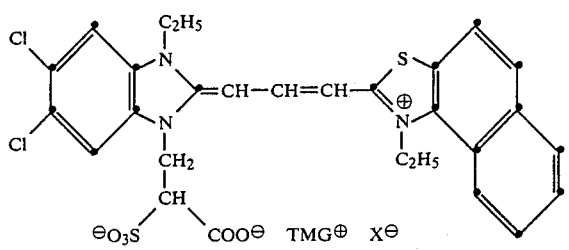

TMG is 1,1,3,3-tetramethylguanidine.

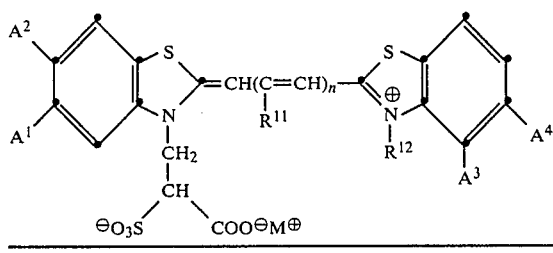

| Example No. | A¹ | A² | M | R¹¹ | n | R¹² | A³ | A⁴ |
|---|---|---|---|---|---|---|---|---|
| 28 | CH₃O | H | K | — | 0 | C₂H₅ | H | H |
| 29 | CH₃O | CH₃O | K | — | 0 | C₂H₅ | H | H |
| 30 | H | H | K | — | 0 | C₂H₅ | —CH=CH—CH=CH |
| 31 | CH₃O | H | K | — | 0 | C₂H₅ | —CH=CH—CH=CH |
| 32 | CH₃O | CH₃O | K | — | 0 | C₂H₅ | —CH=CH—CH=CH |

TABLE 3-continued
Dyes With N(2-Carboxy-2-sulfoethyl) Substituents

| | | | | | | | | |
|---|---|---|---|---|---|---|---|---|
| 33 | H | H | K | CH$_3$ | 1 | C$_2$H$_5$ | H | H |
| 34 | H | H | Na | CH$_3$ | 1 | *3-SP$^\ominus$ | H | H |
| 35 | H | H | K | CH$_3$ | 1 | C$_2$H$_5$ | H | H |
| 36 | Cl | H | K | C$_2$H$_5$ | 1 | C$_2$H$_5$ | H | Cl |
| 37 | CH$_3$O | H | K | CH$_3$ | 1 | C$_2$H$_5$ | H | CH$_3$O |

*SP is sulfopropyl

TABLE 4
Dyes With N—(1-thiosulfatoalkyl) Substituents

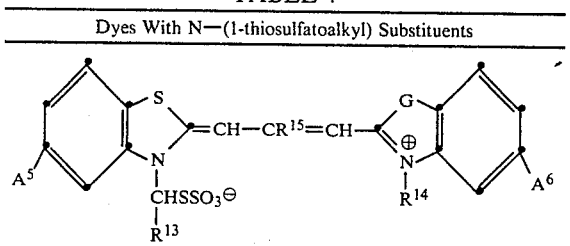

| Example No. | A$^5$ | R$^{13}$ | R$^{15}$ | G | R$^{14}$ | A$^6$ |
|---|---|---|---|---|---|---|
| 38 | H | C$_3$H$_7$ | H | O | C$_2$H$_5$ | H |
| 39 | H | C$_3$H$_7$ | H | S | C$_2$H$_5$ | H |
| 40 | H | C$_3$H$_7$ | C$_2$H$_5$ | O | CH$_3$ | C$_6$H$_5$ |
| 41 | H | H | H | O | C$_2$H$_5$ | H |
| 42 | Cl | C$_3$H$_7$ | H | S | H | Cl |

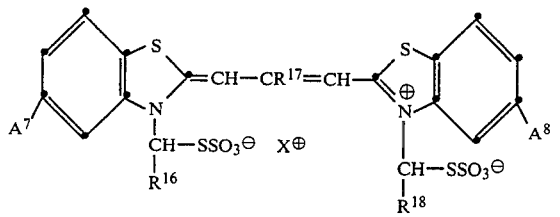

| Example No. | A$^7$ | R$^{16}$ | R$^{17}$ | R$^{18}$ | A$^8$ | X$^\oplus$ |
|---|---|---|---|---|---|---|
| 43 | H | C$_3$H$_7$ | H | C$_3$H$_7$ | H | *TEA$^\oplus$ |
| 44 | Cl | C$_3$H$_7$ | H | C$_3$H$_7$ | H | **Pyr$^\oplus$ |
| 45 | H | H | H | H | H | Pyr$^\oplus$ |
| 46 | H | H | C$_2$H$_5$ | H | H | Pyr$^\oplus$ |
| 47 | Cl | H | H | H | H | Pyr$^\oplus$ |

*TEA is triethylamine.
**Pyr is pyridine.

TABLE 5
Dyes With N—(1-Sulfatoalkyl) Substituents

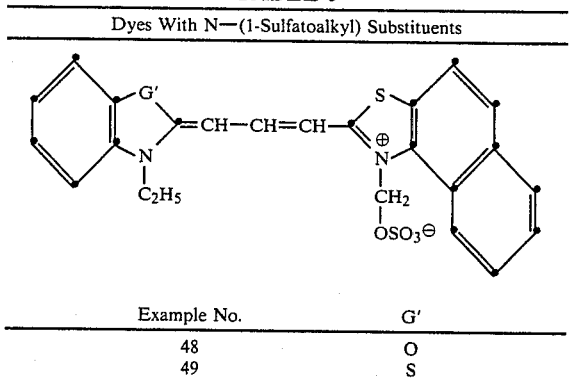

| Example No. | G' |
|---|---|
| 48 | O |
| 49 | S |

Example 50

TABLE 5-continued
Dyes With N—(1-Sulfatoalkyl) Substituents

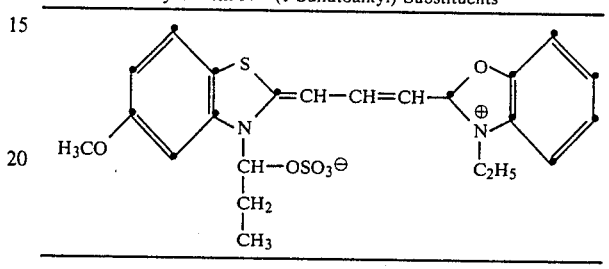

TABLE 6
Dyes With N—(2-Alkylsulfonylcarbamoylethyl) Substituents

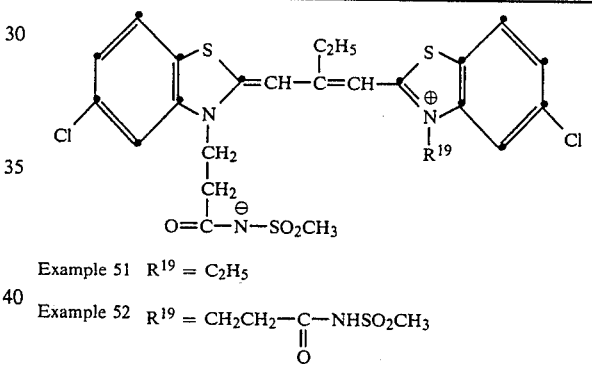

Example 51  R$^{19}$ = C$_2$H$_5$

Example 52  R$^{19}$ = CH$_2$CH$_2$—C—NHSO$_2$CH$_3$
              ‖
              O Example 53

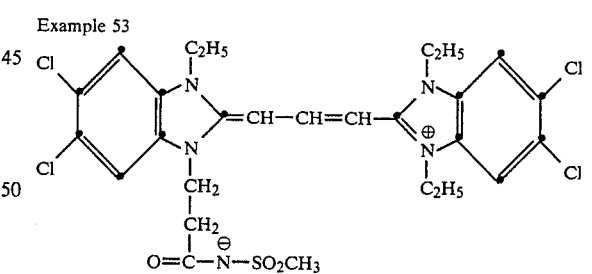

TABLE 7
Dyes With Hydroxy n-α-Alkylene Groups

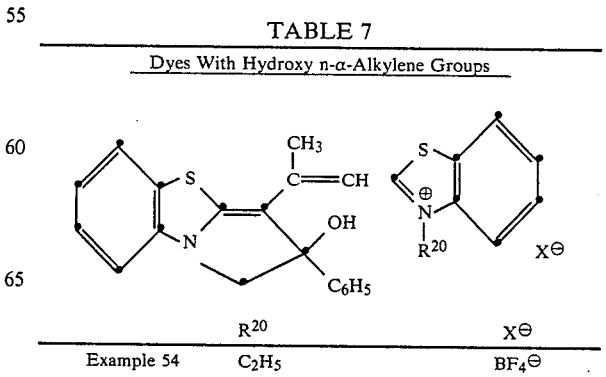

| | R$^{20}$ | X$^\ominus$ |
|---|---|---|
| Example 54 | C$_2$H$_5$ | BF$_4^\ominus$ |

TABLE 7-continued
Dyes With Hydroxy n-α-Alkylene Groups

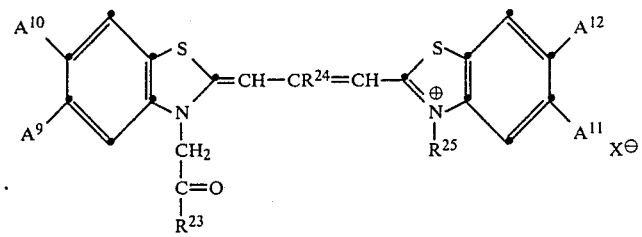

| | $R^{20}$ | $X^\ominus$ |
|---|---|---|
| Example 55 | —CH$_2$CH$_2$CH$_2$SO$_3^\ominus$ | |

TABLE 8
Dyes With N—Cyanoalkyl Groups

| | $R^{21}$ | $R^{22}$ | $X^\ominus$ |
|---|---|---|---|
| Example 56 | —CH$_2$CN | —CH$_2$CN | *pts$^\ominus$ |
| Example 57 | —CH$_2$CH$_2$CN | —CH$_2$CH$_2$CN | I$^\ominus$ |

*pts is para-toluenesulfonate

TABLE 9
Dyes With N—Acyl or N—Aroylmethyl Substituents

| Ex. No. | A$^9$ | A$^{10}$ | R$^{23}$ | R$^{24}$ | R$^{25}$ | A$^{11}$ | A$^{12}$ | X$^\ominus$ |
|---|---|---|---|---|---|---|---|---|
| 58 | H | H | CH$_3$ | H | C$_2$H$_5$ | H | H | I$^\ominus$ |
| 59 | H | H | CH$_3$ | CH$_3$ | C$_2$H$_5$ | H | H | BF$_4^\ominus$ |
| 60 | H | H | CH$_3$ | H | —CH$_2$C(=O)—CH$_3$ | H | H | I$^\ominus$ |
| 61 | H | H | C$_6$H$_5$ | CH$_3$ | C$_2$H$_5$ | H | H | BF$_4^\ominus$ |
| 62 | H | H | C$_6$H$_5$ | H | —CH$_2$C(=O)—C$_6$H$_5$ | | | |
| 63 | CHO$_3$— | H | C$_6$H$_5$ | H | —CH$_2$C(=O)—C$_6$H$_5$ | CH$_3$O— | H | Br$^\ominus$ |
| 64 | CHO$_3$— | CH$_3$O— | C$_6$H$_5$ | H | —CH$_2$C(=O)—C$_6$H$_5$ | CH$_3$O— | CH$_3$O | Br$^\ominus$ |

Example 65

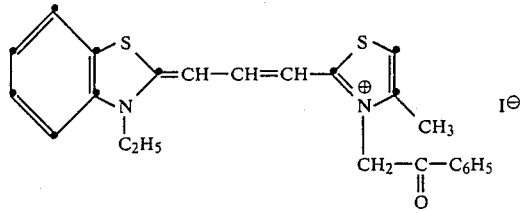

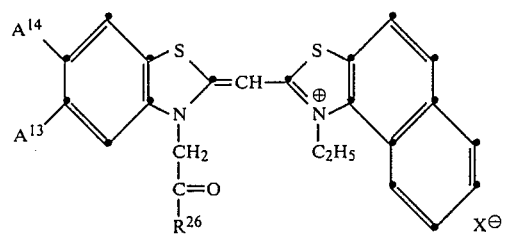

| Example No. | A$^{13}$ | A$^{14}$ | R$^{26}$ | X$^\ominus$ |
|---|---|---|---|---|

TABLE 9-continued
Dyes With N—Acyl or N—Aroylmethyl Substituents

| | | | | |
|---|---|---|---|---|
| 66 | H | H | $CH_3$— | $BF_4^\ominus$ |
| 67 | $CH_3O$— | H | $CH_3$— | $Br^\ominus$ |
| 68 | $CH_3O$— | $CH_3O$— | $CH_3$— | $Br^\ominus$ |
| 69 | H | H | $C_6H_5$— | $Br^\ominus$ |
| 70 | $CH_3O$— | H | $C_6H_5$— | $Br^\ominus$ |
| 71 | $CH_3O$— | $CH_3O$— | $C_6H_5$— | $Br^\ominus$ |
| 72 | H | H | $4\text{-}CH_3O\text{—}C_6H_4$— | $Br^\ominus$ |
| 73 | $CH_3O$— | H | $4\text{-}CH_3O\text{—}C_6H_4$— | $Br^\ominus$ |
| 74 | $CH_3O$— | $CH_3O$— | $4\text{-}CH_3O\text{—}C_6H_4$— | $Br^\ominus$ |
| 75 | H | H | $4\text{-}BrC_6H_4$— | $Br^\ominus$ |

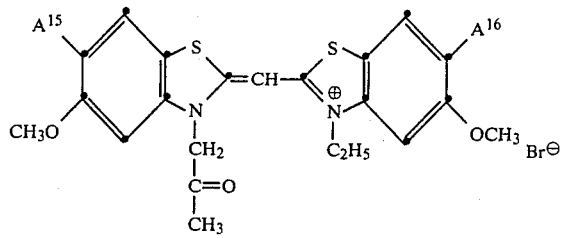

Example 76  $A^{15} = A^{16} = H$
Example 77  $A^{15} = A^{16} = -OCH_3$

TABLE 10
N—Acetylalkyl Substituted Dyes

Example 78:

[structure]  $Br^\ominus$

[structure]  $X^\ominus$

| Example No. | $G^2$ | $R^{27}$ | $X^\ominus$ |
|---|---|---|---|
| 79 | S | $C_2H_5$ | $BF_4^\ominus$ |
| 80 | S | 3-*SP$^\ominus$ | — |

TABLE 10-continued
N—Acetylalkyl Substituted Dyes

| 81 | Se | $C_2H_5$ | |

*SP is sulfopropyl.

TABLE 11
N—Benzyl Substituted Dyes

[structure]  $X^\ominus$

| Example No. | $R^{28}$ | $X^\ominus$ |
|---|---|---|
| 82 | $CH_3\overset{O}{\underset{\|}{C}}\text{—}O$— | $Br^\ominus$ |
| 83 | $CH_3O\overset{O}{\underset{\|}{C}}$— | $Br^\ominus$ |
| 84 | $^\ominus O\overset{O}{\underset{\|}{C}}$— | — |

TABLE 12
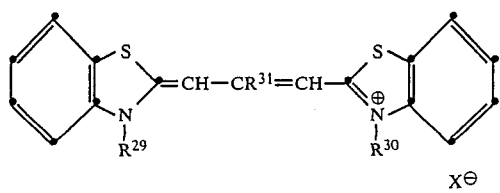
| Example No. | R²⁹ | R³¹ | R³⁰ | X⊖ |
|---|---|---|---|---|
| 85 | CH₂-C₆H₄-OOCCH₃ (2-acetoxybenzyl) | CH₃ | C₂H₅ | BF₄⊖ |
| 86 | CH₂-C₆H₄-OOCCH₃ (2-acetoxybenzyl) | H | CH₂-C₆H₄-OOCCH₃ (2-acetoxybenzyl) | BF₄⊖ |
| 87 | CH₂-C₆H₄-OOCCH₃ (2-acetoxybenzyl) | CH₃ | 3-SP⊖ | — |
| 88 | CH₂-C₆H₄-OH (2-hydroxybenzyl) | H | H | CF₃COO⊖ |
| 89 | CH₂-C₆H₃(OH)₂ (2,5-dihydroxybenzyl) | H | CH₂-C₆H₃(OH)₂ (2,5-dihydroxybenzyl) | ClO₄⊖ |

TABLE 12-continued
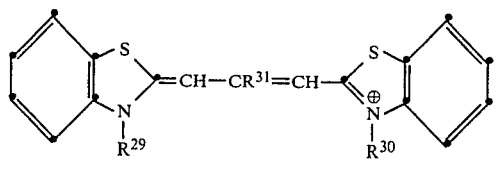
| Example No. | R²⁹ | R³¹ | R³⁰ | X⁻ |
|---|---|---|---|---|
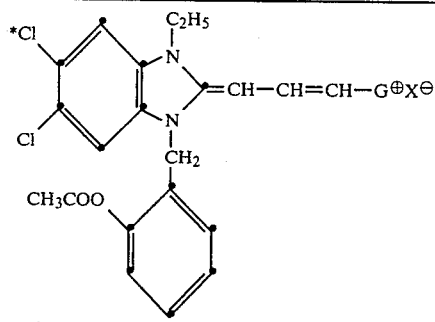
*G⊕ herein is defined in following Examples 90–92.
| 90 | 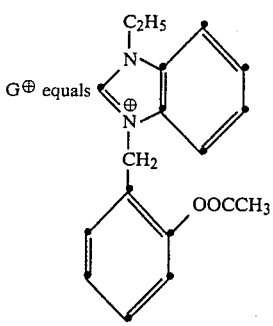 | | | X⁻ = I⁻ |
| 91 | 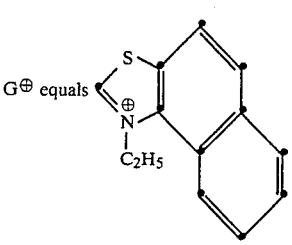 | | | X⁻ = pts⁻ |
| 92 | 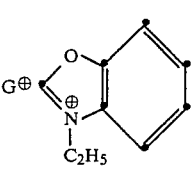 | | | X⁻ = I⁻ |
| 93 | 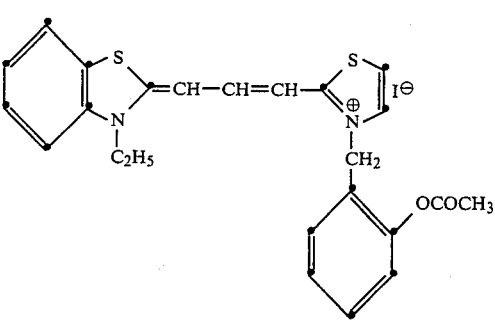 | | | |

TABLE 12-continued

[Structure: benzothiazole–CH=CR³¹–CH=benzothiazole cyanine dye with R²⁹, R³⁰, X⁻]

| Example No. | R²⁹ | R³¹ | R³⁰ | X⁻ |
|---|---|---|---|---|
| 94 | [benzothiazolium with N-CH₂-(2-CH₃COO-phenyl)], CH=CH—CH=CH= connecting to N,N'-diethyl-2-thiobarbiturate group | | | |

TABLE 13
Miscellaneous Dyes

[Structure: benzothiazole=CH–naphtho[2,1]thiazolium with N-R and N-C₂H₅]

| Example 95 | R = —CH₂CH(OH)—CH₂—SO₃⁻ |
|---|---|
| Example 96 | R = —CH₂CH₂—PO₃⁻H |

COMPARATIVE EXAMPLE NO. 1

The following two dyes 1A and 1B were incorporated in a 0.14μ chemically unsensitized gelatino silver bromoiodide emulsion containing 2.5% iodide. The dyes were added to separate portions of the emulsion at a concentration of $22.5 \times 10^{-4}$ moles/mole of silver and the emulsions were heated at 50° C. for ten minutes. A portion of a gelatin melt containing (a) 2,2'-(ethylenebiscarbamoyl)benzoic acid,
(b) 2,2'-(trimethylenediamino)bis(2-thiazoline),
(c) 2,2'-[ureylenebis(ethylenethio)]bis(2-imidazoline), and
(d) 4-hydroxymethyl-4-methyl-1-phenyl-3-pyrazolidinone was added and the emulsions were coated to produce silver coverage of 1.40 g/m² on a poly(ethylene terephthalate) film support. A sample of each coating was exposed in a commercial spectral sensitometer to a quartz-halogen light source through a Wratten 80 B color correcting filter, diffraction grating with filters to remove second order transmission and superimposed step wedge to produce a developable latent image. The resulting exposed samples were developed by uniformly heating them to 180° C. for ten seconds. A density versus log exposure curve (D log E) was determined for each sample at 400 nanometers and at each 10 nanometer interval between 400 nanometers and 700 nanometers. The speed at 0.3 density units above fog was read from each D log E curve, adjuted for a uniform energy distribution over the spectral range, and plotted against wavelength to obtain a relative log spectral sensitivity curve. The sensitizing maximum for each dye was determined from this curve. The spectral sensitizing results are in Table 14. Both dyes are good spectral sensitizers of the silver halide photographic emulsion of this example and their activity in the emulsion as spectral sensitizers is similar.

Dye 1A: Anhydro 3-(2-carboxy-2-sulfoethyl)3'-ethyl-9-methylthiacarbocyanine hydroxide, potassium salt

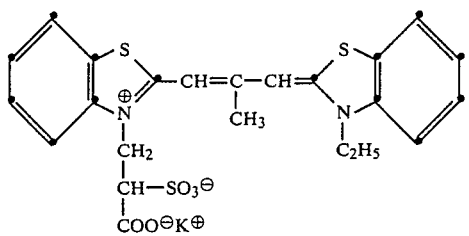

Dye 1B: 9-ethyl-3,3'-bis(3-sulfobutyl)thiacarbocyanine hydroxide, triethylamine salt

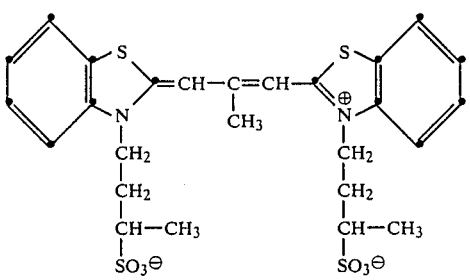

TABLE 14

|  | Relative Speed at 400 nm | Sensitizing Maxima (nm) | | Sensitizing Range (nm) |
| --- | --- | --- | --- | --- |
| Dye 1A: | 126 | 530 | 590 | 390–640 |
| Dye 1B: | 126 | 540 | 600 | 390–660 |
| Undyed: | 100 | — | — | to 500 nm |

Figure 2:
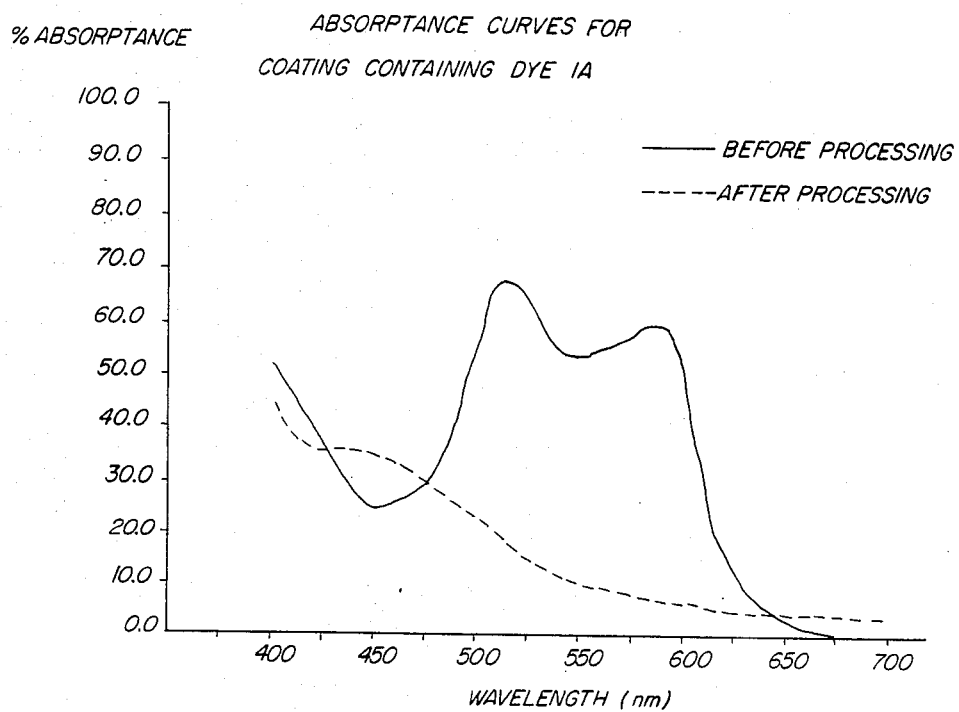

Absorptance curves were also obtained for the coatings before and after processing. FIG. 1 of the drawings is a reproduction of the absorptance curve for the coating containing Dye 1B. FIG. 2 of the drawings is a reproduction of the absorptance curve for the coating containing Dye 1A. The FIG. 1 illustrates that although the absorptance of Dye 1B is altered upon processing, the Dye 1B is still present in the processed coating. The process coating containing Dye 1B is bright magenta in color. The FIG. 2 illustrates that the absorptance in the visible region of the spectrum for the coating containing Dye 1A is essentially removed upon processing leaving only a pale yellow color in the coating. This illustrates that a dye according to the invention (Dye 1A) is bleached upon thermal processing in a silver halide photographic material.

The invention has been described in detail with particular reference to preferred embodiments thereof, but it will be understood that variations and modifications can be effected within the spirit and scope of the invention.

What is claimed is:

1. In a spectrally sensitized silver halide photothermographic element comprising a support bearing photographic silver halide spectrally sensitized by means of at least one spectral sensitizing dye, the improvement comprising:
as said spectral sensitizing dye, at least one heat bleachable cyanine spectral sensitizing dye having the structure

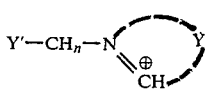

wherein Y' represents atoms which cause said dye to be heat bleachable at processing temperature of the photothermographic element; Y represents a moiety which completes a cyanine spectral sensitizing dye including, if necessary, an associated ion to maintain charge neutrality; and, n is 1 or 2 based on the valence of Y'.

2. A spectrally sensitized silver halide photothermographic element as in claim 1 wherein said spectral sensitizing dye is capable of being bleached within 60 seconds at a temperature within the range of about 80° C. to about 200° C., at a pH of at least 8.

3. In a spectrally sensitized silver halide photothermographic element as in claim 1 comprising as said spectral sensitizing dye, at least one heat bleachable spectral sensitizing dye selected from the group consisting of:

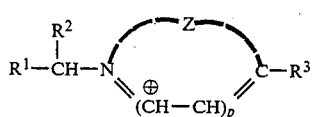

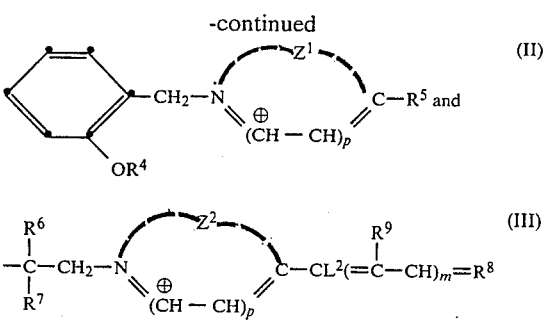

wherein
$R^1$ is sulfo, sulfato, thiosulfato, cyano, arylsulfonyl, acyl or aroyl;
$R^2$ is hydrogen or alkyl;
$R^3$, $R^5$, and $R^8$ are individually selected from moieties which complete cyanine spectral sensitizing dyes including, if necessary, an associated ion to maintain charge neutrality;
$R^4$ is hydrogen or acyl;
$R^6$ and $R^7$ are individually electronegative groups which are carboxy, sulfo and acyl;
$L^1$ and $L^2$ are hydrogen or taken together represent atoms required to complete an N-αalkylene bridge; and when $L^1$ and $L^2$ represent atoms required to complete an N-αalkylene bridge, then $R^6$ is hydrogen, alkyl or aryl, $R^7$ is hydroxy and p equals 0;
$R^9$ is hydrogen, alkyl or aryl;
$Z$, $Z^1$ and $Z^2$ are individually atoms necessary to complete a basic cyanine dye nucleus; and
p and m are individually 0 or 1.

4. A spectrally sensitized silver halide photothermographic element as in claim 1 wherein $R^3$ and $R^5$ are individually

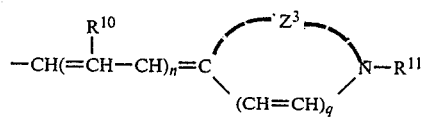

wherein
$R^{10}$ is hydrogen, alkyl or aryl;
$R^{11}$ is alkyl, aryl, or a heterocyclic group;
$Z^3$ represents the atoms necessary to complete a basic cyanine dye nucleus;
q is 0 or 1; and
n is 0, 1 or 2.

5. A spectrally sensitized silver halide photothermographic element as in claim 1 also comprising a binder.

6. A spectrally sensitized silver halide photothermographic element as in claim 1 comprising
(i) a silver halide developing agent, and
(ii) an activating concentration of an activator precursor.

7. A spectrally sensitized silver halide photothermographic element as in claim 1 comprising
(i) an oxidation-reduction image-forming combination comprising
(a) an organic silver salt oxidizing agent, with
(b) an organic reducing agent for said organic silver salt oxidizing agent.

8. A spectrally sensitized silver halide photothermographic element as in claim 1 wherein said spectral sensitizing dye is represented by the formula:

[Structural formula]

wherein z is 0, 1 or 2;

$Z^4$ and $Z^5$ individually are atoms necessary to complete a heterocyclic cyanine dye nucleus;

$M^\oplus$ is a cation;

$R^{12}$ is hydrogen, alkyl, aryl or a heterocyclic group; and

R is hydrogen, aryl or alkyl.

9. A spectrally sensitized silver halide photothermographic element as in claim 1 wherein said spectral sensitizing dye is represented by the formula

[Structural formula]

wherein z is 0, 1 or 2;

$Z^6$ represents the atoms necessary to complete a heterocyclic cyanine dye nucleus;

$Z^7$ represents the atoms necessary to complete a heterocyclic cyanine dye nucleus;

$R^{13}$ is hydrogen or alkyl; p1 $R^{14}$ is hydrogen, alkyl or aryl; and $R^{15}$ is hydrogen or alkyl.

10. A spectrally sensitized silver halide photothermographic element as in claim 1 wherein said spectral sensitizing dye is represented by the formula

[Structural formula]

wherein q is 0, 1 or 2;

$Z^8$ and $Z^9$ individually represent the atoms necessary to complete a heterocyclic cyanine dye nucleus;

$R^{16}$ and $R^{17}$ are individually hydrogen or alkyl; and $R^{18}$ is hydrogen, alkyl, aryl or a heterocyclic group.

11. A spectrally sensitized silver halide photothermographic element as in claim 1 wherein said spectral sensitizing dye is represented by the formula

[Structural formula]

wherein q is 0, 1 or 2;

$Z^{10}$ and $Z^{11}$ individually represent atoms necessary to complete a heterocyclic cyanine dye nucleus;

$R^{19}$ is alkyl or aryl;

$R^{20}$ is hydrogen or alkyl;

$R^{21}$ is hydrogen, alkyl, aryl or a heterocyclic group; and $X^\ominus$ is an anion.

12. In a spectrally sensitized silver halide photothermographic element comprising a support bearing, in reactive association, in a gelatino binder (a) photographic silver halide spectrally sensitized by means of at least one spectral sensitizing dye, (b) a silver halide developing agent, (c) an activator precursor, and (d) a stabilizer precursor, the improvement comprising as said spectral sensitizing dye a bleachable spectral sensitizing dye selected from the group consisting of dyes represented by the formulas

[Structural formulas]

-continued

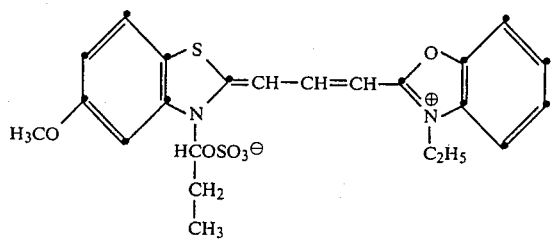

and

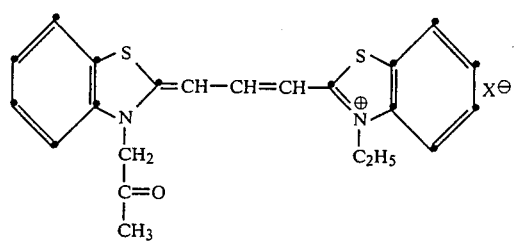

and combinations thereof;
wherein M⊕ is a cation and X⊖ is an anion.

13. In a spectrally sensitized silver halide photothermographic element comprising a support bearing, in reactive association, in binder,
(a) photographic silver halide spectrally sensitized by means of a spectral sensitizing dye, and
(b) an oxidation-reduction image-forming combination comprising
(i) an organic silver salt oxidizing agent with
(ii) an organic reducing agent for said organic silver salt oxidizing agent,
the improvement comprising: as said spectral sensitizing dye, a heat bleachable spectral sensitizing dye selected from the group consisting of dyes represented by the formulas

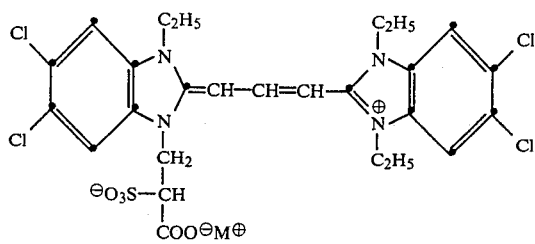

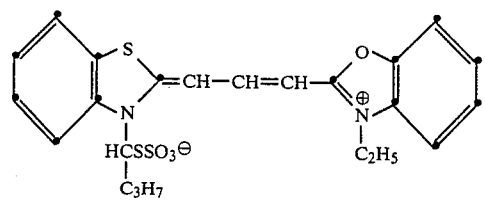

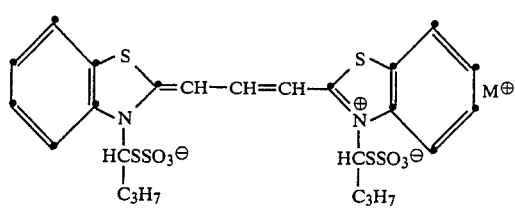

-continued

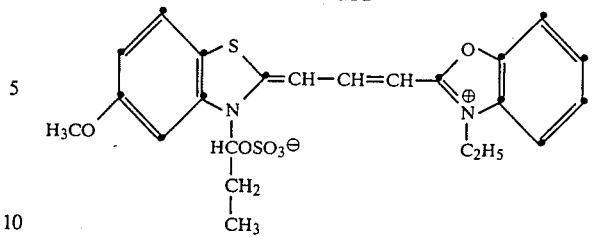

and

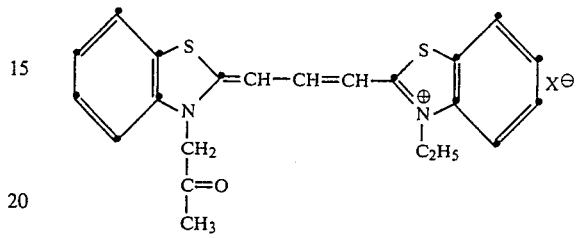

and combinations thereof;
wherein M⊕ is a cation and X⊖ is an anion.

14. A process of (i) developing an image in an exposed photothermographic element as defined in claim 1, and (ii) changing said spectral sensitizing dye to an essentially colorless compound, comprising heating said photothermographic element to a temperature within the range of about 80° to about 200° C. until said image is developed and said dye is changed to essentially colorless.

15. A process of (i) developing an image in an exposed photothermographic element as defined in claim 12 and (ii) changing said spectral sensitizing dye to an essentially colorless compound, comprising heating said photothermographic element to a temperature within the range of about 80° to about 200° C. until said image is developed and said dye is changed to essentially colorless.

16. A process of (i) developing an image in an exposed photothermographic element as defined in claim 13 and (ii) changing said spectral sensitizing dye to an essentially colorless compound, comprising heating said photothermographic element to a temperature within the range of about 80° to about 200° C. until said image is developed and said dye is changed to essentially colorless.

17. A process of (i) developing an image in an exposed photothermographic element as defined in claim 1, and (ii) changing said spectral sensitizing dye to an essentially colorless compound, comprising heating said photothermographic element to a temperature within the range of about 80° C. to about 200° C. at a pH within the range of about 8 to about 14 until said image is developed and said dye is changed to essentially colorless.

18. A process of (i) developing an image in an exposed photothermographic element as defined in claim 12, and (ii) changing said spectral sensitizing dye to an essentially colorless compound, comprising heating said photothermographic element to a temperature within the range of about 80° C. to about 200° C. at a pH within the range of about 8 to about 14 until said image is developed and said dye is changed to essentially colorless.

19. A process of (i) developing an image in an exposed photothermographic element as defined in claim 12, and (ii) changing said spectral sensitizing dye to an essentially colorless compound, comprising heating said photothermographic element to a temperature within the range of about 80° C. to about 200° C. at a pH within the range of about 8 to about 14 until said image is developed and said dye is changed to essentially colorless.

* * * * *